Jan. 7, 1936.  L. H. MORIN ET AL  2,026,904
METHOD OF MANUFACTURING FASTENER DEVICES
Filed Dec. 20, 1933
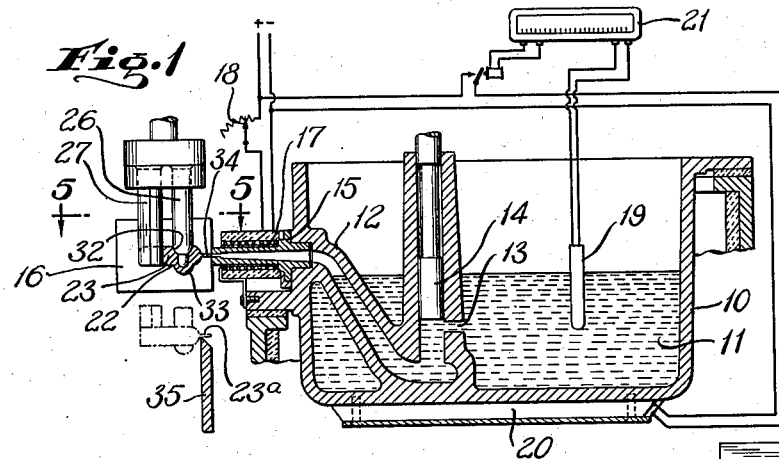
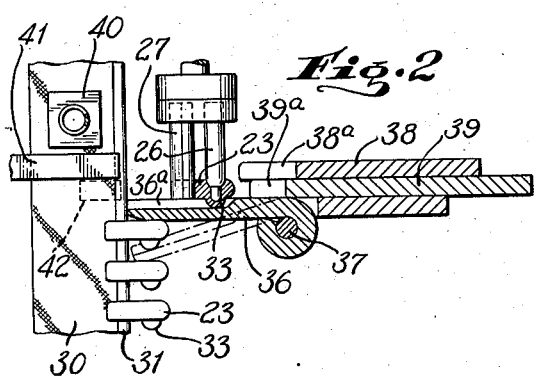
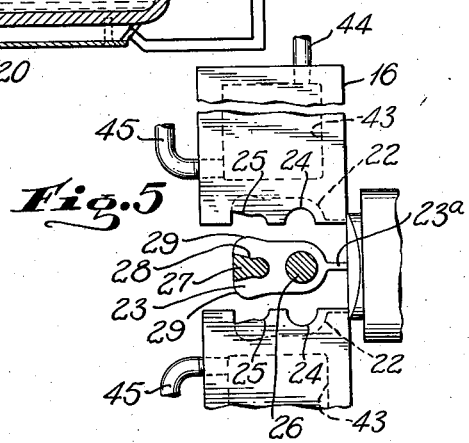
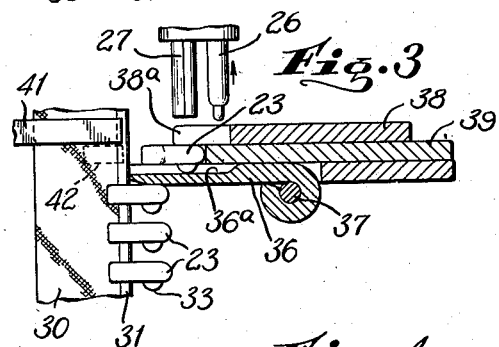
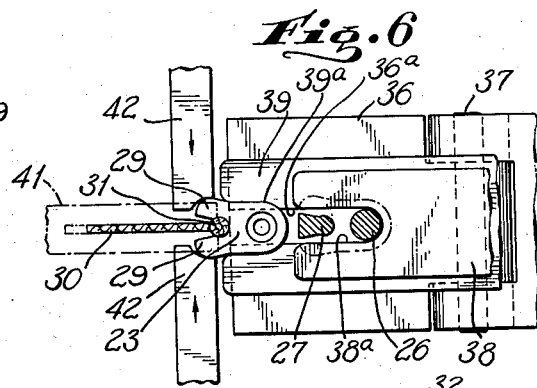
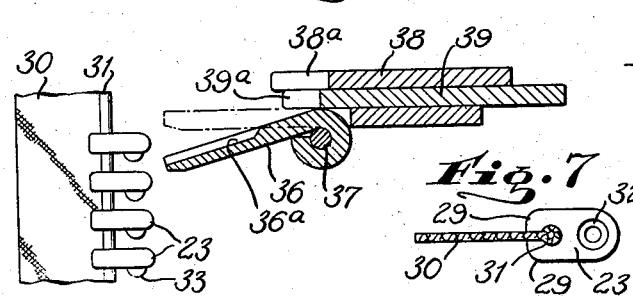
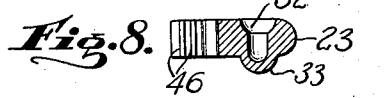
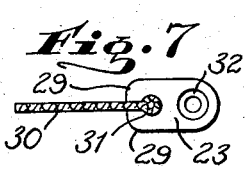
INVENTORS.
LOUIS H. MORIN
AND DAVIS MARINSKY
BY
ATTORNEY.

Patented Jan. 7, 1936

2,026,904

UNITED STATES PATENT OFFICE 2,026,904

METHOD OF MANUFACTURING FASTENER DEVICES

Louis H. Morin and Davis Marinsky, New York, N. Y., assignors to Whitehall Patents Corporation, New York, N. Y., a corporation of New York Application December 20, 1933, Serial No. 703,165

20 Claims. (Cl. 29—148)

This invention relates to the manufacture of devices involving a mounting member in the form of a strand, strip or tape of suitable material, upon which is applied a plurality of spaced diecast links or elements; and the object of the invention is to provide a method involving a successive series of steps which consists in first forming a molded or cast link or element, then moving it into engagement with trimming, ejecting and feeding means to apply the formed link or element upon a mounting member, and then securing the link to said member and spacing the links longitudinally of said member; a further object being to provide a method of forming fasteners wherein the links or elements are cast or molded upon multiple core elements or parts used as a means for feeding the formed link into position to be engaged by the stripping and feed mounting means; a further object being to provide means for automatically maintaining the temperature of certain molding and casting materials employed in the container therefor as well as to control the temperature of the nozzle through which such materials are injected into the mold chambers of a die employed for forming the successive links; and with these and other objects in view, the invention consists in a method of the class and for the purpose specified, which is more fully hereinafter described and claimed.

The invention is fully disclosed in the following specification, of which the accompanying drawing forms a part, in which the separate parts of our improvement are designated by suitable reference characters in each of the views, and in which:

Fig. 1 is a diagrammatic, sectional view of a part of the apparatus employed for carrying our improved method into effect.

Fig. 2 is a diagrammatic sectional view indicating other portions of an apparatus employed for carrying the method into effect.

Figs. 3 and 4 are views similar to Fig. 2 showing parts in different positions and with parts removed.

Fig. 5 is a sectional view on the line 5—5 of Fig. 1.

Fig. 6 is a sectional plan view of the structures shown in Figs. 2 and 3, showing parts in a different position and indicating another step in the method.

Fig. 7 is a sectional, detail view showing a mounting member with one of the links applied thereto; and, Fig. 8 is a longitudinal, sectional view through a link detached from the mounting member and illustrating a modification.

For the purpose of diagrammatically illustrating one method of carrying our invention into effect, we have indicated at 10 in Fig. 1 of the drawing a pot or container for the molding or casting material 11, the pot 10 including a gooseneck discharge 12 of conventional form, the material 11 entering the gooseneck passage through an aperture 13 controlled by a piston or plunger 14, which in the construction shown is employed as a means for forcing the molding material 11 from the gooseneck 12 into and outwardly through a discharge nozzle 15, the outer end of which abuts against the die 16 employed.

At 17, we have indicated an electric heating unit for maintaining the nozzle 15 at the proper temperature to prevent any possible congestion of the molding material in said nozzle, it being understood that, in the upward stroke of the piston 14 after completing a casting or molding operation in the die 16, the material is drawn back into the container 10, as will be apparent. A rheostat or other control 18 is employed for regulating the temperature of the heating unit 17. Another temperature control tube or device 19 is disposed in the material 11 of the container to maintain the temperature of the material 11 substantially constant through suitable electric heating means indicated at 20, the latter being controlled and regulated by a pyrometer 21 in circuit with the heating means 20 and control 19.

At this time, it will be understood that our invention is not necessarily limited to the means herein disclosed for forcing the molding or casting material 11 into the dies as other means may be employed as is taught in our prior application Serial Number 701,290 filed December 7, 1933, of which this application constitutes a continuation and improvement, and this is also true with respect to application Serial Number 661,099 filed March 16, 1933, as well as application Serial Number 701,291 filed December 7, 1933.

The distinctive features of the present invention reside in the independent formation of the cast or molded link or element and the application of said element upon a suitable mounting member to form various types, kinds and classes of articles of manufacture involving a mounting member of predetermined structure upon which is disposed a series of molded or cast elements.

The dies 16 in the construction shown consist of two substantially similar parts, each having on their adjacent surfaces, impressions 22, defining the contour of a link or element 23 to be formed and recesses 24 and 25 to receive respectively two core parts 26 and 27, the latter extending into the impressions 22 to a degree indicated in Fig. 1 of the drawing so as to form at one end of the link 23 a U-shaped or V-shaped recess 28 forming separate side jaws or claws 29 adapted to be disposed upon opposite side faces of a mounting member 30 which in the construction shown is in the form of a fabric tape or strip having an enlarged bead or corded edge 31 upon which and the adjacent part of the tape, the claws 29 will compress to securely retain the element 23 against displacement therefrom, it being understood that the inner end of the recess 28 is of such contour as to envelop the edge 31 and to compress the same sufficiently to provide positive engagement.

The core 26 forms on one side face of the element 23 a socket or recess 32 to receive the bead or knob 33 on the other side face of an opposed element when our invention is employed for the manufacture of what are known as the stringers of separable slide fasteners, and in this type of devices, the end portions of the elements 23 disposed outwardly of the beaded edge 31 form the coupling or interlocking portions of said elements in coupling one stringer with another companion stringer as is well known in this art.

The cores 26 and 27 are supported and operated in such manner as to be positioned between the separate parts of the die 16 when said die parts are moved toward each other and held in firm engagement with each other under pressure as is common in the molding and diecasting practice.

After a casting has been formed by the injection of the material 11 thereinto through a conventional gate 34, the dies are then separated and the cores 26 and 27 with the formed element 23 thereon are moved relatively to the dies, in which operation, the gate 23a of the element 23 is trimmed off by a trimming tool or blade 35 as is indicated in Fig. 1 of the drawing immediately beneath the die 16. In continuing the movement of the cores 26, 27, the formed element 23 thereon is brought into engagement with the upper surface of a key guide and spacing plate 36 having a pivotal mounting as indicated at 37. The plate 36 includes part of a stripping and feeding means which consists of a yoke-shaped stripping plate 38 and a feed plunger 39. After the parts have been brought into the position shown in Fig. 2 of the drawing, the stripping plate 38 is advanced to bring the yoke-shaped end 38a thereof over the link or element 23, after which the cores 26 and 27 are moved upwardly, thus ejecting the element 23 from the cores, permitting said cores to return to the position between the separate parts of the die 16, as will be apparent. At this time, attention is also directed to the fact that the cores 26 and 27 act as a means of ejecting the formed elements 23 from the separate parts of the die 16 when said dies are separated as is indicated in Fig. 5 of the drawing.

At the forward end of the guide plate 36 is supported the mounting tape 30 as is clearly illustrated in Fig. 2 of the drawing, suitable friction or other means 40 being employed to hold the tape against accidental movement, and a yoke-shaped backing tool 41 is disposed on the member 30 engaging the beaded edge 31 thereof at a point above the feed plunger 39 so as to prevent lateral movement of the tape in the operation of advancing the feed member 39 as is indicated in Fig. 3 of the drawing, in the operation of applying the element 23 to the member 30, the completion of which operation is shown in Fig. 6 of the drawing, it being understood that the outer end of the member 39 is yoke-shaped in form as indicated at 39a, Fig. 6, to envelop the element 23, preventing any possible lateral movement of said element and maintaining the same in proper alinement with the mounting member 30. It will also be noted that the plate 36 is grooved on its upper surface as seen at 36a to receive the projecting bead 33 of the element 23 in the sliding movement of the element 23 over said plate. It will be understood that the dimensions of the recess 28 or in other words the spread of the jaws or claws 29 is such as to pass over the corded edge 31 of the member 30. While the parts are in the position shown in Fig. 6, two pinching or compressing tools 42 are moved toward each other and the claws 29 to firmly compress the same upon the member 30 and the edge 31 thereof in the manner indicated in Fig. 6 of the drawing.

After this operation is performed, the tools 42 are moved out of engagement with the element 33 and the plate 36 is moved downwardly as is indicated in dotted lines in Fig. 2 of the drawing to feed the formed link or element 23 including the tape or member 30 to provide for the mounting of the next link or element 23 thereon. After the feeding operation has been performed and the member 30 held by the friction or other means 40, the plate 36 is drawn outwardly and returned to horizontal position in the manner indicated in Fig. 4 of the drawing, the other parts, namely the stripping member 38 and the feed plunger 39 are returned to the position shown in Fig. 2, ready for receiving the next link.

It will be understood that the above operations will be performed consecutively and simultaneously in a single machine or apparatus, it being apparent that after stripping a link or element 23 from the cores and returning the cores to position between the dies, another casting will be formed during the operation of feeding and compressing the element 23 on the member 30 and the spacing of said member and said elements for receiving the next casting formed, thus losing no time in the production of the complete device.

It will be understood that various types and classes of molding or casting materials may be employed, the structure of the apparatus and the means for ejecting such materials being modified to suit the particular nature or consistency thereof, it being understood that various types of diecasting metals or alloys may be used, such as commonly known in the art, or cellulose acetates may be employed, or on the other hand, resins or synthetic resins. But, when the method is carried out for producing moldings or castings from metal or cellulose acetates, the dies or separate parts thereof are cooled by water circulating chambers 43 therein arranged adjacent the impressions 22, note Fig. 5, suitable inlet pipes 44, one of which is shown, and outlet pipes 45 being employed for circulating the cooling water or other agent through the die parts. It will be understood that the connections to the pipes or tubes 44 and 45 will be flexible to compensate for the movement of the dies.

In the construction shown in Figs. 1 to 7 inclusive, the inner adjacent surfaces of the claws or jaw ends 29 of the elements 23 which engage the member 30 inwardly of the beaded edge 31 are plain. It will be apparent, however, that the core 27 may be of such cross sectional contour as to provide longitudinal ribs or beads 46 on said surfaces as is indicated in Fig. 8 of the drawing to provide what may be termed roughened engaging surfaces, and this would be desirable when attaching the elements 23, especially to members 30 having plain or smooth surfaces, such for example, to a piece of leather, metal or a composition, and this is especially true when the elements 23 are applied to a member 30 which is not provided with the bead or corded edge 31, it being understood in this connection that our invention is not necessarily limited to the production of fastening devices of the class herein illustrated nor is the invention limited to the shape or contour of the elements formed by the die, and still further to any specific manner of arranging, spacing or supporting the same on a mounting member. In this connection it will be further understood that with our improved method, links or elements may be directly applied to an article of manufacture in connection with which they are to be employed, and in this sense, such article of manufacture constitutes in the sense of the invention here defined the mounting member.

It will be apparent that our invention is not necessarily limited to the use of the core or core parts herein disclosed, as these elements are employed for the production of the specific link disclosed, and it will be further understood that various other changes in and modifications of the method herein disclosed may be made within the scope of the appended claims without departing from the spirit of our invention or sacrificing its advantages.

Having fully described our invention, what we claim as new and desire to secure by Letters Patent, is:

1. The herein described method of producing in a successive series of operations of an apparatus, a mounting member with a plurality of molded or cast elements applied thereto which consists in first molding an element between relatively movable die parts, then feeding the formed element from the die parts and applying the same to a mounting member, applying pressure to the element to secure the same on said member, trimming the element prior to its application to said member, feeding said member to space the same for receiving the next adjacent element to be applied thereto, and molding the element on a core disposed between said relatively movable die parts and utilizing said core as a feeding means for the element when removed from the die parts.

2. The herein described method of producing in a successive series of operations of an apparatus, a mounting member with a plurality of molded or cast elements applied thereto which consists in first molding an element between relatively movable die parts, then feeding the formed element from the die parts and applying the same to a mounting member, applying pressure to the element to secure the same on said member, trimming the element prior to its application to said member, feeding said member to space the same for receiving the next adjacent element to be applied thereto, molding the element on a core disposed between said relatively movable die parts and utilizing said core as a feeding means for the element when removed from the die parts, injecting the molding material into the mold chamber of the die parts under pressure and cooling said die parts adjacent said mold chamber.

3. The herein described method of producing in a successive series of operations of an apparatus, a mounting member with a plurality of molded or cast elements applied thereto which consists in first molding an element between relatively movable die parts, then feeding the formed element from the die parts and applying the same to a mounting member, applying pressure to the element to secure the same on said member, trimming the element prior to its application to said member, feeding said member to space the same for receiving the next adjacent element to be applied thereto, molding the element on a core disposed between said relatively movable die parts and utilizing said core as a feeding means for the element when removed from the die parts, injecting the molding material into the mold chamber of the die parts under pressure and cooling said die parts adjacent said mold chamber, discharging the molding material through a nozzle disposed adjacent the die parts, and automatically heating the nozzle and the molding material to predetermined temperature.

4. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts and feeding the same onto a supporting member, applying pressure to said element to secure the same upon said member against displacement therefrom and then moving said member to arrange another portion thereof in position to receive the next successive link to be applied thereto.

5. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts and feeding the same onto a supporting member, applying pressure to said element to secure the same upon said member against displacement therefrom and then moving said member to arrange another portion thereof in position to receive the next successive element to be applied thereto, and supporting and bracing said member in the operation of applying the element thereon.

6. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts and feeding the same onto a supporting member, applying pressure to said element to secure the same upon said member against displacement therefrom, then moving said member to arrange another portion thereof in position to receive the next successive element to be applied thereto, and finish shaping said element prior to the application thereof onto said member.

7. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts, and feeding the same onto a supporting member, applying pressure to said element to secure the same upon said member against displacement therefrom, then moving said member to arrange another portion thereof in position to receive the next successive element to be applied thereto, disposing a core in the impression of the die parts to form the element on said core, and utilizing said core as a means of ejection from said die parts and as a feeding means.

8. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts and feeding the same onto a supporting member, applying pressure to said element to secure the same upon said member against displacement therefrom, then moving said member to arrange another portion thereof in position to receive the next successive element to be applied thereto, disposing a core in the impression of the die parts to form the element on said core, utilizing said core as a means of ejection from said die parts and as a feeding means, and removing the element from the core by a stripping and supplemental feeding means for feeding or applying the element upon said member.

9. The herein described method of forming a die molded product of the class described which consists in providing relatively movable die parts with a mold impression disposed between adjacent surfaces thereof, injecting heated molding material into the impression of the die parts under pressure while maintaining said die parts in abutting relation under pressure to form by said impression an element of predetermined contour, then removing the formed element from the die parts and feeding the same onto a supporting member, applying pressure to said element to secure the same upon said member against displacement therefrom, then moving said member to arrange another portion thereof in position to receive the next successive element to be applied thereto, disposing a core in the impression of the die parts to form the element on said core, utilizing said core as a means of ejection from said die parts and as a feeding means, removing the element from the core by a stripping and supplemental feeding means for feeding or applying the element upon said member, and securing the element to said member by pressure means disposed at opposite side faces of said member and that part of the element arranged thereon.

10. The herein described method of producing articles of manufacture of the class described which consists in supporting a mounting member in a machine, intermittently forming a plurality of die cast elements in a successive series of casting operations, intermittently feeding the cast elements directly upon said member and securing the same thereon in said successive series of casting operations to produce on said member a plurality of spaced die cast elements fixedly attached thereto, forming said elements by impressions formed in adjacent surfaces of relatively movable die parts and introducing the casting material into said impression under pressure while maintaining said die parts in firm engagement with each other.

11. The herein described method of producing articles of manufacture of the class described which consists in supporting a mounting member in a machine, intermittently forming a plurality of die cast elements in a successive series of casting operations, intermittently feeding the cast elements directly upon said member and securing the same thereon in said successive series of casting operations to produce on said member a plurality of spaced die cast elements fixedly attached thereto, forming said elements by impressions formed in adjacent surfaces of relatively movable die parts and introducing the casting material into said impression under pressure while maintaining said die parts in firm engagement with each other, and finish shaping the elements when removed from the die parts and prior to the application thereof onto said member.

12. The herein described method of producing in a successive series of operations of an apparatus, a mounting member with a plurality of molded or cast elements applied thereto which consists in forcing molding material into relatively movable dies under pressure to form an element between said dies, then feeding the formed element from the dies and applying the same to a mounting member, and applying pressure to the element to secure the same on said member.

13. The herein described method of producing in a successive series of operations of an apparatus, a mounting member with a plurality of molded or cast elements applied thereto which consists in forcing molding material into relatively movable dies under pressure to form an element between said dies, then feeding the formed element from the dies and applying the same to a mounting member, applying pressure to the element to secure the same on said member, and trimming the element prior to its application to said member.

14. The herein described method of producing in a successive series of operations of an apparatus, a mounting member with a plurality of molded or cast elements applied thereto which consists in forcing molding material into relatively movable dies under pressure to form an element between said dies, then feeding the formed element from the dies and applying the same to a mounting member, applying pressure to the element to secure the same on said member, trimming the element prior to its application to said member, and feeding said member to space the same for receiving the next adjacent element to be applied thereto.

15. The herein described method of forming and applying dies castings onto a mounting member in a successive series of operations, which consists in supporting a mounting member adjacent means for applying and compressing castings onto said member, and forcing casting material under pressure into impressions formed between adjacent surfaces of relatively movable die parts arranged in spaced relation to said means to form castings between said die parts and feeding the castings from said dies to said first named applying and compressing means for application to said member.

16. The herein described method of forming and applying die castings onto a mounting member in a successive series of operations, which consists in supporting a mounting member adjacent means for applying and compressing castings onto said member, forcing casting material under pressure into impressions formed between adjacent surfaces of relatively movable die parts arranged in spaced relation to said means to form castings between said die parts and feeding the castings from said dies to said first named applying and compressing means for application to said member, and shaping the die casting to retain the same against displacement from said member.

17. The herein described method of forming and applying die castings onto a mounting member in a successive series of operations, which consists in supporting a mounting member adjacent means for applying and compressing castings onto said member, forcing casting material under pressure into impressions formed between adjacent surfaces of relatively movable die parts arranged in spaced relation to said means to form castings between said die parts and feeding the castings from said dies to said first named applying and compressing means for application to said member, shaping the die casting to retain the same against displacement from said member, and forming coupling portions on the castings outwardly of said member.

18. The herein described method of producing cast articles of manufacture which consists in moving dies toward and from each other and into engagement with a pair of core members disposed between adjacent surfaces of the dies and including parts extending into the impression formed between adjacent surfaces of the dies, forcing a casting material into the impression of the dies when in closed position to form a casting therein and around that part of the cores disposed in said impression, separating the dies from the casting leaving the casting disposed on said cores, feeding the casting by the cores into predetermined position, and then removing the casting from said cores.

19. The herein described method of producing articles of manufacture of the class described which consists in supporting a mounting member in a machine, intermittently introducing casting material under pressure into die parts when in closed position to form a plurality of die cast elements having jaw ends in a successive series of casting operations, intermittently feeding the cast elements directly upon said member with the jaw ends straddling one edge of the same, and securing said elements thereon by applying pressure to said jaw ends simultaneously from opposed sides of said member in each said successive series of casting operations to produce on said member a plurality of spaced die cast elements fixedly attached thereto.

20. The herein described method of producing articles of manufacture of the class described which consists in supporting a mounting member in a machine, intermittently introducing casting material under pressure into die parts when in closed position to form a plurality of die cast elements having jaw ends in a successive series of casting operations, intermittently feeding the cast elements directly upon said member with the jaw ends straddling one edge of the same, securing said elements thereon by applying pressure to said jaw ends simultaneously from opposed sides of said member in each said successive series of casting operations to produce on said member a plurality of spaced die cast elements fixedly attached thereto, and said elements when applied to said member including coupling portions projecting beyond said edge having male and female portions on opposite surfaces thereof.

LOUIS H. MORIN.
DAVIS MARINSKY.